US011929063B2

(12) United States Patent
Akinwande et al.

(10) Patent No.: US 11,929,063 B2
(45) Date of Patent: Mar. 12, 2024

(54) OBFUSCATING AUDIO SAMPLES FOR HEALTH PRIVACY CONTEXTS

(71) Applicant: International Business Machines Corporation, Armonk, NY (US)

(72) Inventors: Victor Abayomi Akinwande, Karen (KE); Celia Cintas, Nairobi (KE); Komminist Weldemariam, Ottawa (CA); Aisha Walcott, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/534,396

(22) Filed: Nov. 23, 2021

(65) Prior Publication Data

US 2023/0162726 A1   May 25, 2023

(51) Int. Cl.
| | | |
|---|---|---|
| *G10L 15/16* | (2006.01) | |
| *G06N 3/045* | (2023.01) | |
| *G06N 3/084* | (2023.01) | |
| *G10L 25/30* | (2013.01) | |
| *G10L 25/87* | (2013.01) | |

(52) U.S. Cl.
CPC .............. *G10L 15/16* (2013.01); *G06N 3/045* (2023.01); *G06N 3/084* (2013.01); *G10L 25/30* (2013.01); *G10L 25/87* (2013.01)

(58) Field of Classification Search
CPC .......... G10L 15/16; G10L 25/30; G10L 25/87
USPC .................................................. 704/232
See application file for complete search history.

(56) References Cited

U.S. PATENT DOCUMENTS

| | | | |
|---|---|---|---|
| 7,050,969 B2 | 5/2006 | Raj | |
| 2013/0297316 A1 | 11/2013 | Cragun | |
| 2019/0320974 A1* | 10/2019 | Alzamzmi | ............. A61B 5/746 |
| 2020/0105267 A1 | 4/2020 | Singh | |
| 2020/0258535 A1 | 8/2020 | Vatanparvar | |
| 2021/0118574 A1* | 4/2021 | Peri | ......................... G16H 20/00 |
| 2022/0147876 A1* | 5/2022 | Dalli | ...................... G06N 20/00 |

OTHER PUBLICATIONS

Guided Generative Adversarial Neural Network for Representation Learning and High Fidelity Audio Generation using Fewer Labelled Audio Data Kazi Nazmul Haque, Rajib Rana, John H. L. Hansen, Björn Schuller (Year: 2003).*

(Continued)

*Primary Examiner* — Bharatkumar S Shah
(74) *Attorney, Agent, or Firm* — Shimon Benjamin; Otterstedt & Kammer PLLC

(57) ABSTRACT

A supervised discriminator for detecting bio-markers in an audio sample dataset is trained and a denoising autoencoder is trained to learn a latent space that is used to reconstruct an output audio sample with a same fidelity as an input audio sample of the audio sample dataset. A conditional auxiliary generative adversarial network (GAN) trained to generate the output audio sample with the same fidelity as the input audio sample, wherein the output audio sample is void of the bio-markers. The conditional auxiliary generative adversarial network (GAN), the corresponding supervised discriminator, and the corresponding denoising autoencoder are deployed in an audio processing system.

20 Claims, 7 Drawing Sheets

(56) References Cited

OTHER PUBLICATIONS

Pooja Guhan etal, ABC—Net: Semi-Supervised Multimodal GAN-based Engagement Detection using an Affective, Behavioral and Cognitive Model. Arxiv.org, Cornell University Library,• Nov. 17, 2020 (Nov. 17, 2020). pp. 12.

Zhang Rong et al: "Biomarker Localization by Combining CNN Classifier and Generative Adversarial Network", Oct. 10, 2019 (Oct. 10, 2019) 16th European Conference—Computer Vision, pp. 10.

Shiwei Shen et al: "APE-GAN: Adversarial Perturbation Elimination with GAN",. arXiv: 1707.05474v2 [cs.CV], Sep. 14, 2017 (Sep. 14, 2017), XP055537418, Retrieved from the Internet: URL:https://arxiv.org/abs/1707.05474v2 [retrieved on Dec. 20, 2018]. pp. 14.

Authorized officer Dobler, Ervin European Patent Office, PCT EP2022/082005. International Search Report, dated Feb. 17, 2023. pp. 10.

Vatanparvar, Korosh, et al. A generative model for speech segmentation and obfuscation for remote health monitoring. In2019 IEEE 16th International Conference on Wearable and Implantable Body Sensor Networks (BSN) May 1, 20199 (pp. 1-4). IEEE.

Lee, Sujee et al. Configurable pulmonary-tuned privacy preservation algorithm for mobile devices. In2018 IEEE International Conference on Bioinformatics and Biomedicine (BIBM) Dec. 3, 2018 (pp. 1107-1112). IEEE.

Haque, Kazi Nazmul et al. High-fidelity audio generation and representation learning with guided adversarial autoencoder. IEEE Access. Nov. 2, 20206;8:223509-28.

Lin, Honghuang, et al. Identification of digital voice biomarkers for cognitive health. Exploration of medicine. 2020;1:406-417.

Ahmed, Shimaa, et al. Preech: a System for {Privacy-Preserving} Speech Transcription. In29th USENIX Security Symposium (USENIX Security 20) 2020 (pp. 2703-2720).

Gao, Chuhan, et al. Privacy protection for audio sensing against multi-microphone adversaries. Proceedings on Privacy Enhancing Technologies. Apr. 2019;2019(2). (pp. 146-165).

Zhang, Hanbin, et al. Pdvocal: Towards privacy-preserving parkinson's disease detection using non-speech body sounds. InThe 25th Annual International Conference on Mobile Computing and Networking Aug. 5, 2019 (pp. 1-16).

Nautsch, Andreas, et al. Preserving privacy in speaker and speech characterisation. Computer Speech & Language. Nov. 1, 2019;58:441-80.

Chen, A. (Mar. 14, 2019). Why companies want to Mine the secrets in your voice. The Verge. (pp. 1-6).

App Uses Voice Analysis, downloaded via web.archive.org for https://newsroom.ucla.edu/releases/voice-analysis-app-ai-mental-illness for Sep. 3, 2021. (pp. 1-3).

Covid Voice Detector, downloaded via web.archive.org for https://cvd.lti.cmu.edu/ for Jun. 14, 2021. (p. 1).

Alexa, Do I have Covid-19, downloaded via web.archive.org for https://www.nature.com/articles/d41586-020-02732-4 for Nov. 14, 2021. (pp. 1-13).

Peter Mell and Timothy Grance, The NIST Definition of Cloud Computing, NIST Special Publication 800-145, Sep. 2011, cover, pp. i-iii and 1-3.

\* cited by examiner

OBFUSCATING AUDIO SAMPLES FOR HEALTH PRIVACY CONTEXTS

BACKGROUND

The present invention relates to the electrical, electronic and computer arts, and more specifically, to audio processing systems.

Digital representations of human voices carry a large amount of information about the owner of the voice, including indicators of potential health conditions that the individual may not wish to disclose to third parties. Yet these representations and the representation process are not directly controlled by the individual whose voice is digitized. Moreover, audio representations are increasingly being used by predictive models to predict the early onset of, or to identify the presence of, an illness across a wide variety of conditions, including central nervous system (CNS) disorders, depression, autism spectrum disorder, viral infection, and even heart disease. An individual is generally unaware when the individual's voice is being analyzed for health diagnostic purposes and, even when the individual is aware, the features are often inexplicably linked to the audio of the individual's voice and cannot be easily omitted.

SUMMARY

Principles of the invention provide techniques for obfuscating audio samples for health privacy contexts. In one aspect, an exemplary method includes the operations of training, using at least one processor, a supervised discriminator to detect bio-markers in an audio sample dataset; training, using the at least one processor, a denoising autoencoder to learn a latent space that is used to reconstruct an output audio sample with a same fidelity as an input audio sample of the audio sample dataset; training, using the at least one processor, a conditional auxiliary generative adversarial network (GAN) to generate the output audio sample with the same fidelity as the input audio sample, wherein the output audio sample is void of the bio-markers; and deploying the conditional auxiliary generative adversarial network (GAN), the corresponding supervised discriminator, and the corresponding denoising autoencoder in an audio processing system.

In one aspect, an apparatus comprises a memory and at least one processor, coupled to the memory, and operative to perform operations comprising training a supervised discriminator to detect bio-markers in an audio sample dataset; training a denoising autoencoder to learn a latent space that is used to reconstruct an output audio sample with a same fidelity as an input audio sample of the audio sample dataset; training a conditional auxiliary generative adversarial network (GAN) to generate the output audio sample with the same fidelity as the input audio sample, wherein the output audio sample is void of the bio-markers; and deploying the conditional auxiliary generative adversarial network (GAN), the corresponding supervised discriminator, and the corresponding denoising autoencoder in an audio processing system.

In one aspect, a computer program product for federated learning, the computer program product comprising a computer readable storage medium having program instructions embodied therewith, the program instructions executable by a computer to cause the computer to perform operations comprising training a supervised discriminator to detect bio-markers in an audio sample dataset; training a denoising autoencoder to learn a latent space that is used to reconstruct an output audio sample with a same fidelity as an input audio sample of the audio sample dataset; training a conditional auxiliary generative adversarial network (GAN) to generate the output audio sample with the same fidelity as the input audio sample, wherein the output audio sample is void of the bio-markers; and deploying the conditional auxiliary generative adversarial network (GAN), the corresponding supervised discriminator, and the corresponding denoising autoencoder in an audio processing system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

- an audio codec with embedded bio-marker obfuscation capabilities;
- an obfuscation method that effectively obfuscates an audio sample, thus hiding features that may be used by a predictive model to infer health conditions;
- obfuscation techniques suitable for use in smartwatches, smartphones, home devices and the like;
- technological improvements in privacy and security for computerized audio processing systems utilized in call centers, interactive voice response (IVR) systems, speech recognition applications, and the like, by masking voice traits indicative of private characteristics of an individual, to prevent invasion of privacy, while allowing the speech/audio to remain understandable; and
- obfuscation methods that are bio-marker agnostic and maintain the quality and fidelity of the audio sample while not impacting the compression compute time.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

DETAILED DESCRIPTION

Figure 1:
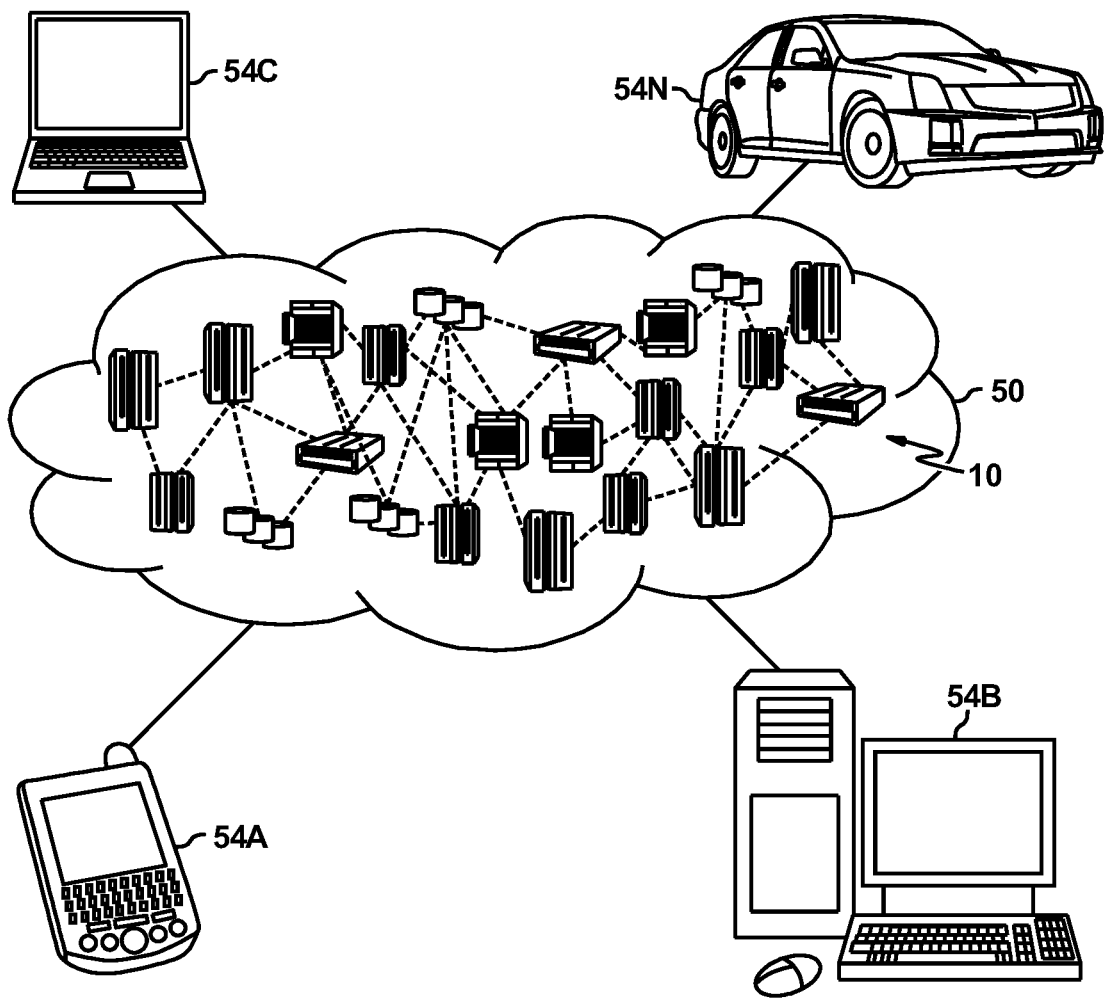
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
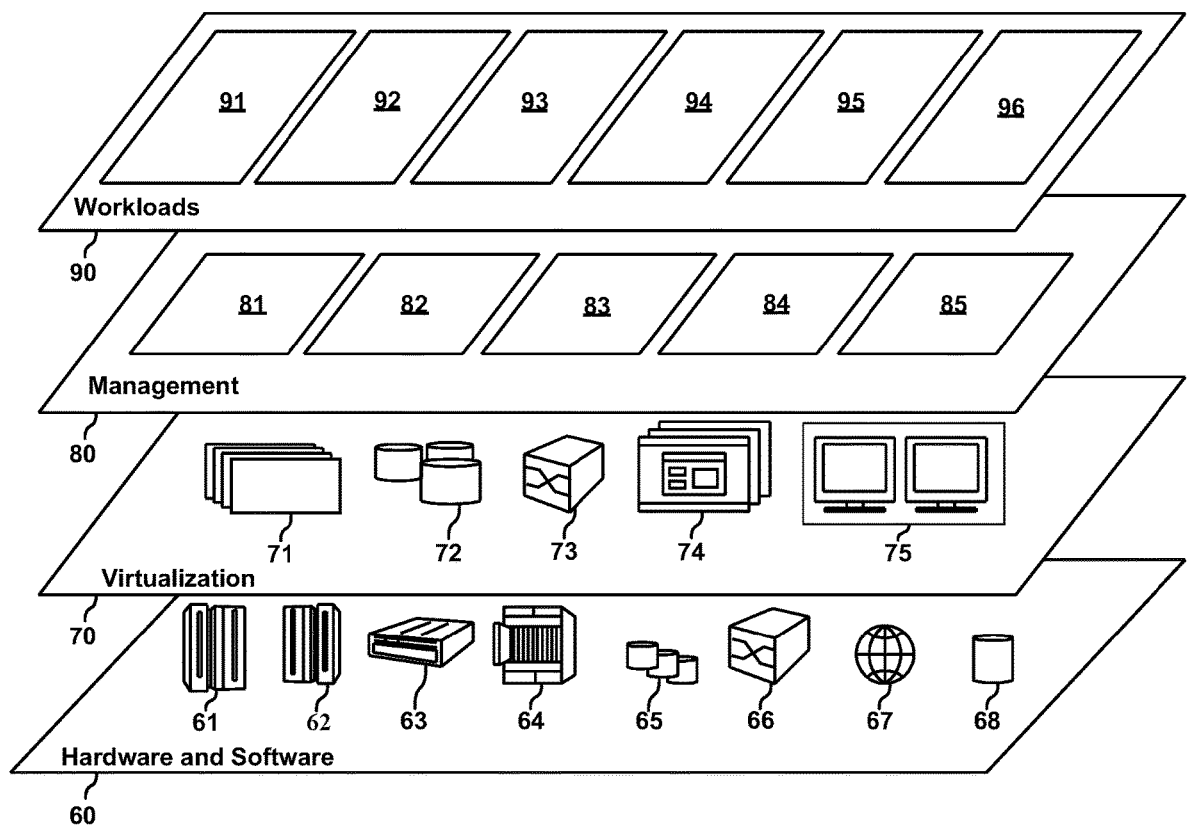
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an audio processing component 96 that implements health privacy obfuscating techniques for audio samples.

Generally, systems and methods for processing audio are disclosed. Digital representations of human voices carry a large amount of information about the owner of the voice, including indicators of potential health conditions that the individual may not wish to disclose to third parties. Yet these representations and the representation process are not directly controlled by the individual whose voice is digitized. Moreover, the representations are increasingly being used by predictive models to predict the early onset of, or to identify the presence of, an illness across a wide variety of conditions, including central nervous system (CNS) disorders, depression, autism spectrum disorder, viral infection and even heart disease. An individual is generally unaware when the individual's voice is being analyzed for health diagnostic purposes and, even when the individual is aware, the features are often inexplicably linked to the audio of the individual's voice and cannot be easily omitted.

In one example embodiment, an audio sample is effectively obfuscated in regard to health conditions and their associated bio-markers, thus hiding features that may be used by a predictive model to infer health conditions, while still maintaining the quality and fidelity of the audio sample. One or more embodiments are, advantageously, not autoregressive; thus, inference is fast and can be used in an audio codec library (which converts audio to a bitstream). In one example embodiment, no explicit input or configuration is needed from the actor (the individual whose voice is analyzed). Thus, one or more embodiments are suitable for use in smartwatches, smartphones, home devices, and the like. In one or more embodiments, the bio-marker is agnostic in the sense that labelled training samples are not required. The disclosed audio processor may be implemented as part of a CODEC library on a machine (e.g. FLAC (Free Lossless Audio Codec), an audio coding format for lossless compression of digital audio), as a plugin into an application that requires audio input or a plugin to a browser, as a recording application that stores audio samples for use in authentication contexts, and the like.

Use Case

Dysphonia, including jitter and shimmer features in voice, is often used to diagnose Parkinson's disease, increasingly by automated systems. While other illness may be less conspicuous, these analysis techniques may still be used for activities that have serious implications for the actor. For example, an actor suffering from Parkinson's may apply for a loan from a bank where the actor has to converse on the phone with a loan officer. If the bank has a diagnostic model running in the background that monitors the actor's voice and detects the actor's health condition, the bank may choose to deny the loan for a medical reason. While the actor may be unable to control the bank's use of the actor's voice, the actor can obfuscate the relevant features of the actor's voice while maintaining the fidelity of other aspects of the actor's voice.

Obfuscation Systems

In one example embodiment, an exemplary obfuscation system obfuscates one or more types of bio-markers. Audio format is being used by predictive models to predict the presence of an illness across a wide variety of conditions, including CNS disorders, depression, autism spectrum disorder, covid, heart disease, and the like. For example, any bio-markers that may be detected in the frequency domain by training a deep learning model may be utilized (mel-frequency cepstral coefficients (MFCC) representations and its variants are a non-limiting example). In one example embodiment, the predictive models do not require labelled examples of audio samples containing the bio-markers for training. In other words, one or more embodiments of the system are bio-marker-agonistic. One or more embodiments can also be extended to other contexts, e.g., preventing implicit discrimination based on accent, workplace cultural diagnostics, and the like.

Figure 3:
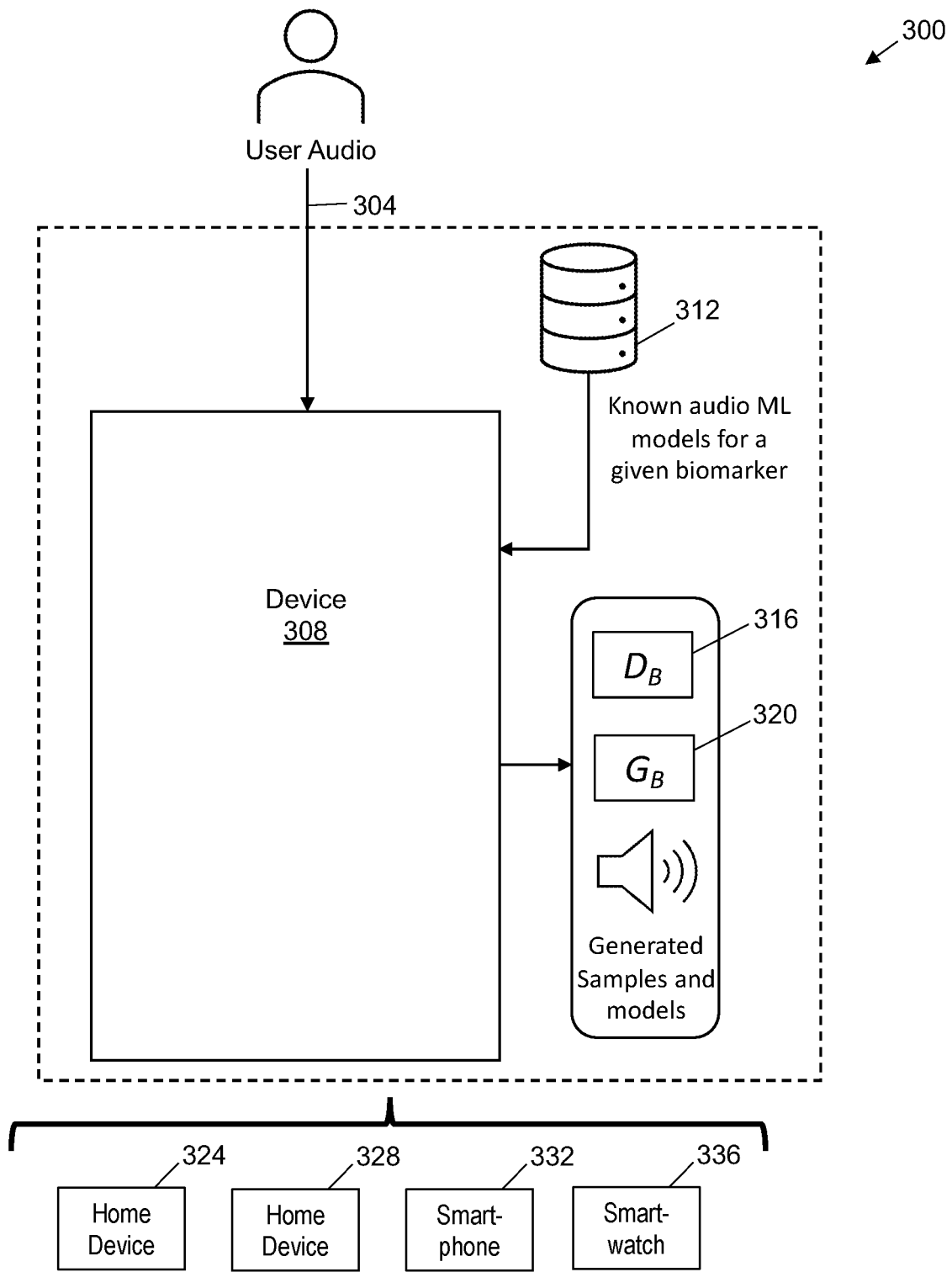
FIG. 3 is a block diagram of an example audio obfuscation environment, in accordance with an example embodiment.

FIG. 3 is a block diagram of an example audio obfuscation environment 300, in accordance with an example embodiment. In one example embodiment, user audio 304 is obtained by a device 308. The device 308 may be a smartphone 332, a smartwatch 336, a home device 324, 328, a personal computer, and the like. The device 308 may receive a digital audio stream or digital audio file, may convert the speech of a user to a digital audio stream or digital audio file, and the like. In one example embodiment, the device 308 executes an audio obfuscation method, as described more fully below in conjunction with FIG. 8. In one example embodiment, the device 308 provides the user audio, in digital or analog form, to a cloud environment that implements the audio obfuscation method and returns obfuscated audio data. The audio obfuscation method utilizes a discriminator 316 and an autoencoder 320, as described more fully below in conjunction with FIGS. 4-6. A database 312 that resides either internal or external to the device 308 maintains audio machine learning models that have been developed for corresponding bio-markers.

Figure 4:
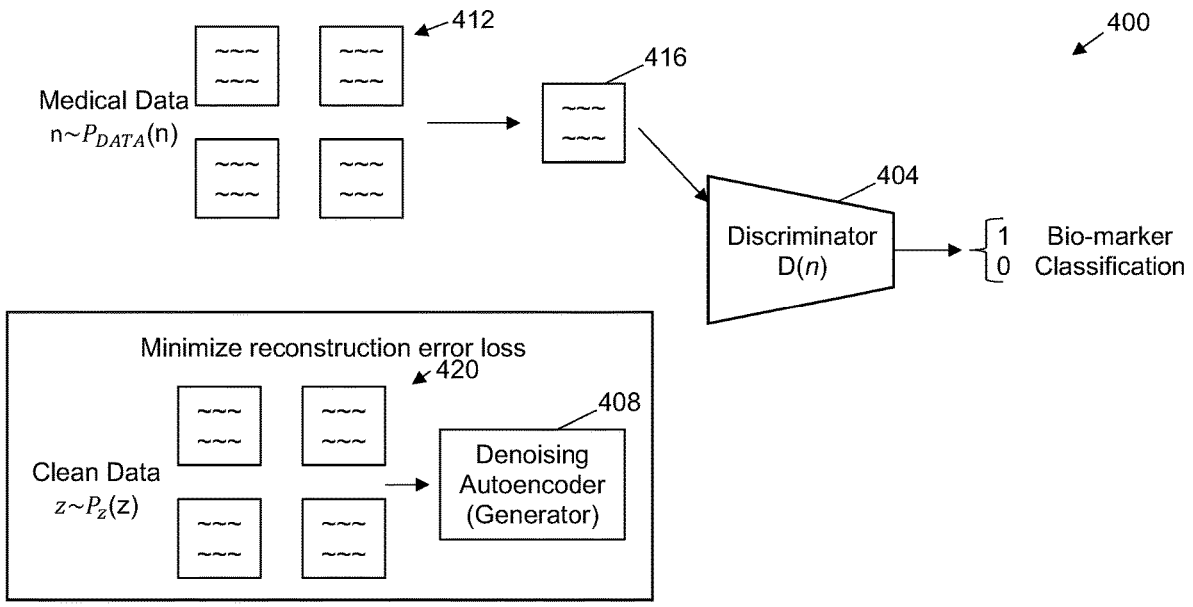
FIG. 4 is a block diagram of a portion of an example audio obfuscation system, in accordance with an example embodiment.

FIG. 4 is a block diagram of a portion of an example audio obfuscation system 400, in accordance with an example embodiment. In one example embodiment, a discriminator 404 is trained on labelled medical data 412 containing audio samples indicative of at least one health condition (and having corresponding labels identifying the medical condition) while minimizing a classification generalization error. The input is the frequency domain representation of the audio sample 416 (mel-frequency spectrum). In one example embodiment, the discriminator 404 is a fully convolutional neural network that takes in mel-frequency cepstral coefficients (MFCC) representations of the audio sample and classifies the presence of a bio-marker, where, for example, a one represents a presence of the corresponding bio-marker and a zero represents an absence of the corresponding bio-marker.

In one example embodiment, a denoising autoencoder 408 is trained on clean samples 420, that is, samples that do not contain bio-markers, to learn a latent representation that is used to reconstruct the input. The training to learn the latent representation that is used to reconstruct the input may be performed, for example, by minimizing a Kullback-Leibler (KL)-divergence-based reconstruction error loss plus a fidelity term based on frequency response, distortion, noise, and time-based errors.

Figure 5:
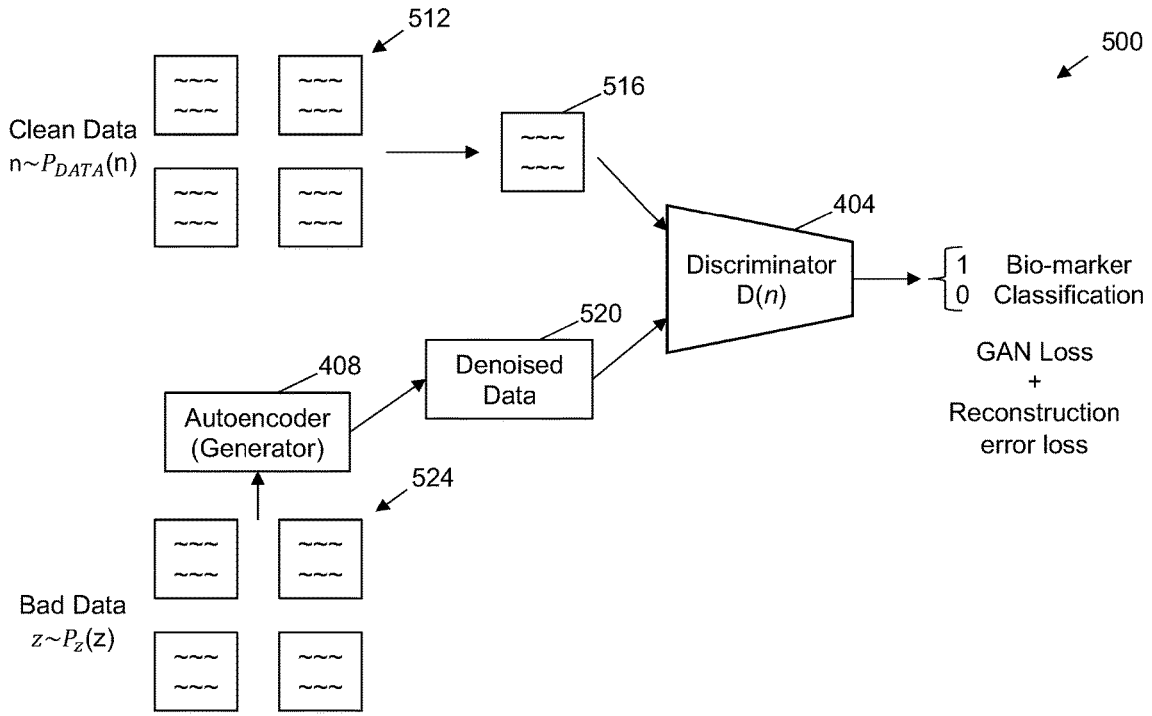
FIG. 5 is a block diagram of an example audio obfuscation system, in accordance with an example embodiment.

FIG. 5 is a block diagram of an example audio obfuscation system 500, in accordance with an example embodiment. In one example embodiment, a discriminator function D of the discriminator 404 is used as a discriminator in a generative adversarial network (GAN) setup 500 with the autoencoder 408 as the generator. Clean samples 512 are preprocessed using known techniques to generate clean preprocessed samples 516, which are input to the discriminator 404. The GAN 500 is trained such that the discriminator 404 attempts to maximize the entropy that clean data 512 passes through the discriminator 404 and is trained to minimize the entropy such that the denoised representation of bad data 524 (containing bio-markers) pass through the discriminator 404; autoencoder 408 attempts to do the opposite. Note that element 516 represents the audio sample preprocessed with the necessary steps to be used by the discriminator 404.

The generator G (autoencoder 408) is frozen, and back-propagation is performed through the discriminator function D using the gradient from the GAN loss. The discriminator function D is frozen and propagation is performed through autoencoder 408 using the gradient from the GAN loss combined with a decaying constant times the reconstruction error loss of generator G. The decaying constant is a hyper-parameter adjusted by the type of audio dataset used and the models' structures. (The skilled artisan will be familiar with selection of hyperparameters via heuristics, and, given the teachings herein, will be able to select suitable values.)

In one example embodiment, the autoencoder 408 is implemented as a fully convolutional neural network that takes in MFCC representations of the audio sample and produces a denoised version 520 of the MFCC input. The above steps are iterated (i.e., carried out iteratively) until convergence is reached. In one example embodiment, convergence is based on a Nash Equilibrium. Furthermore in this regard, in one or more embodiments, referring to FIG. 8, discussed in greater detail below, all steps are repeated during the iterative process except training of the discriminator.

Once trained, the audio obfuscation system 500 is capable of obtaining, as input, an audio sample with a bio-marker and generating another audio sample that is almost equivalent to the obtained audio sample, but that "fools" the discriminator 404 (that was trained to detect such bio-markers) into not recognizing the bio-marker.

Figure 6:
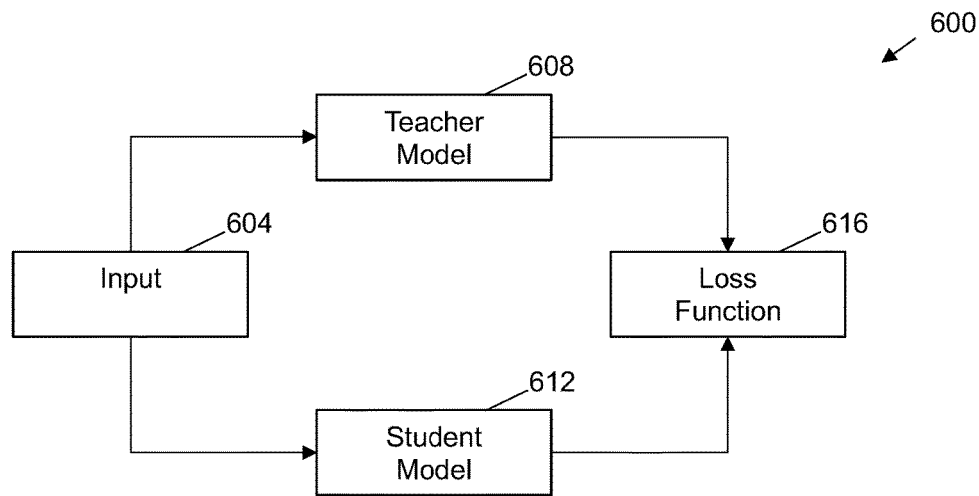
FIG. 6 is a block diagram of an example model distillation system, in accordance with an example embodiment.

FIG. 6 is a block diagram of an example model distillation system 600, in accordance with an example embodiment. In one example embodiment, if access to labelled samples for a given health condition is not available, the discriminator 404 is created through model distillation from a black box teacher model 608. The discriminator 404 may be trained on extracted features from a mel-representation, such as linear predictive coding (LPC) parameters (filter parameters and residual signal). Features may be extracted from the sample that are to be explicitly conditioned on, for example, timbre, accent, and fidelity parameters. The skilled artisan will be familiar with hierarchical decoupling of features in generating images—that is, allowing a GAN that can generate images with certain styles to be trained. The exemplary technique of FIG. 6 presents and enables a novel application of model distillation to audio features.

Effectively, within the generator architecture of the example model distillation system 600, a mapping network (layers) maps from a latent space into another intermediate latent space that parameterizes the high-level features, such as timbre, accent, fidelity, pitch, and the like. Given that direct access to a classifier that has been trained using labelled samples or access to labelled samples may not exist, the black box teacher model 608 utilizes procedures for model distillation. The input 604 includes unlabeled samples which may be collected from a medical corpus, provided by actors wishing to protect their privacy, and the like.

The teacher is an external system or the teacher model 608 of FIG. 6 that processes the inputs 604 and provides a notion of the presence of bio-markers (which can be binary or real-valued). (The teacher system may be accessed, for example, via an API).

The student model 612 distills the discriminatory ability of the teacher model 608 by minimizing a cost-function (e.g., a likelihood loss) based on the prediction of the teacher model 608 and its prediction of the same input 604. In one example embodiment, the loss function 616 is defined based on the outputs provided by the teacher model 608 to be a likelihood loss (e.g., cross entropy), a variational loss (e.g., KL Divergence), and the like. The models (such as the student model 612 and the teacher model 608) may be implemented using recurrent neural networks (RNNs), convolutional neural networks, or a combination of both. These networks are decomposed into input layers with the same dimension as the input (audio samples), hidden layers that include stacked and fully connected units, and an output layer with dimensions corresponding to the number of discriminatory classes (two classes in the case of biomarker or not-biomarker). The networks are trained by optimizing a set of parameters that is iteratively updated to maximize the ability of the network to accurately discriminate between classes for all labeled inputs. Given the teachings herein, the skilled artisan will be able to construct and train these networks.

In one example embodiment, the supervised discriminator 404 and the denoising autoencoder 408 are retrofitted as discriminator and generator of the GAN 500, respectively. A joint loss of the entropy and the reconstruction error of the generator are optimized. In one example embodiment, dilated convolutions are leveraged to preserve the conditional features of the audio sample.

Figure 7:
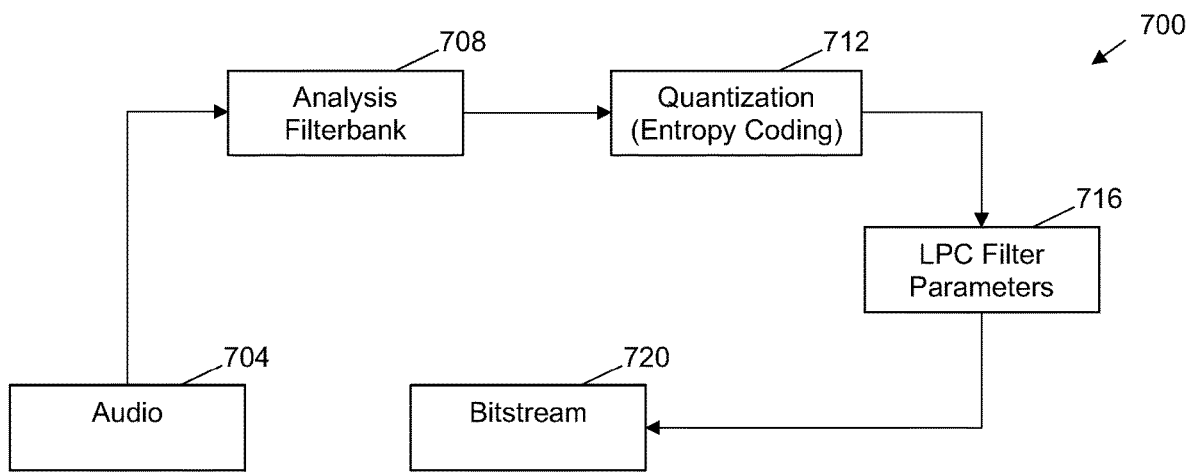
FIG. 7 is a block diagram of an example audio encoding system, in accordance with an example embodiment.

FIG. 7 is a block diagram of a conventional audio codec architecture 700 for a computer system. Audio 704 is processed via an analysis filterbank 708, a quantization (entropy coding) unit 712, and a linear predictive coding (LPC) filter 716 to generate an output audio bitstream 720. The conventional audio codec architecture 700 may be modified to incorporate the disclosed obfuscation technique. In one example embodiment, the disclosed obfuscation technique is implemented between the analysis filterbank 708 and the quantization unit 712. This serves to obfuscate bio-markers for all downstream audio tasks.

Figure 8:
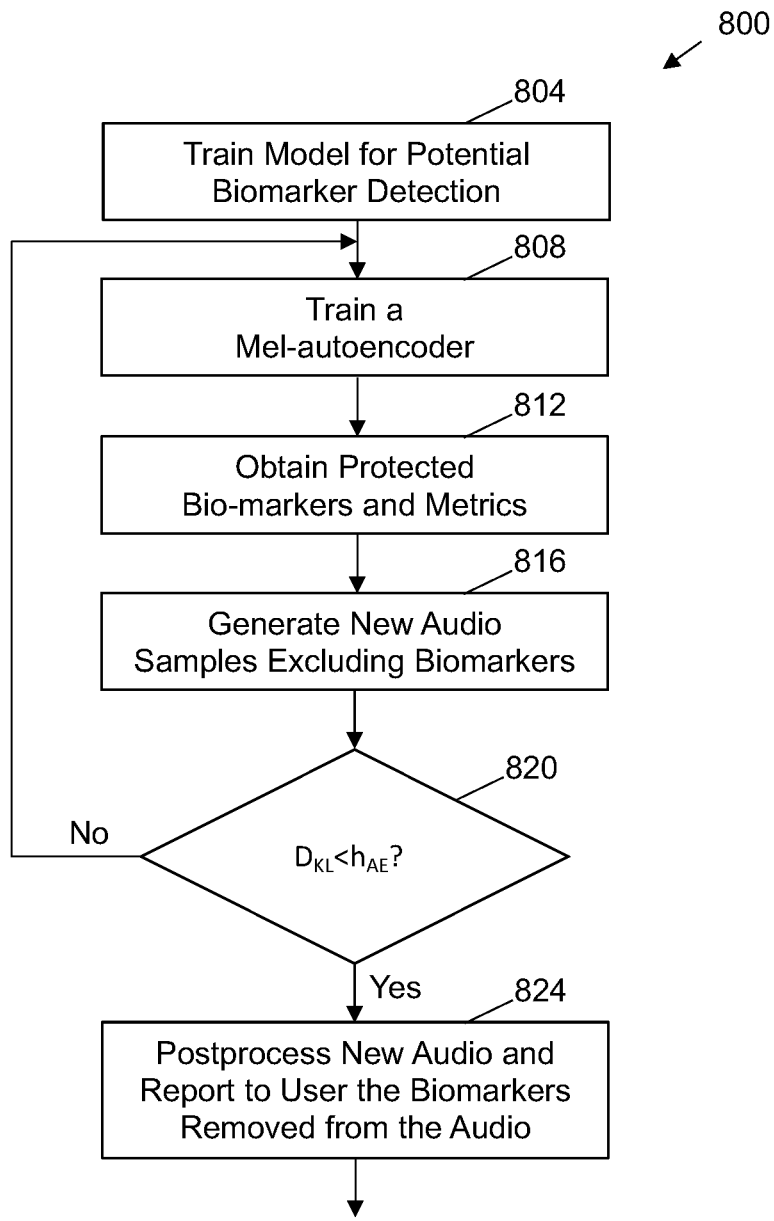
FIG. 8 is a flowchart for an example audio obfuscation method, in accordance with an example embodiment.

FIG. 8 is a flowchart for an example audio obfuscation method 800, in accordance with an example embodiment. In one example embodiment, a model is trained for bio-marker detection (operation 804). An autoencoder 408, such as a mel-autoencoder, is trained (operation 808). Protected bio-markers B and associated metrics M are obtained (operation 812, can also include reconstruction error loss Rec_loss). For example, the identity of the type(s) of bio-markers to be obfuscated may be obtained. New audio samples (data) that obfuscate the bio-markers are generated (operation 816). A check is performed to determine if $D_{KL} < h_{AE}$ (operation 820), where $D_{KL}$ is a Kullback-Leibler (KL)-divergence and $h_{AE}$ is an acceptable threshold of quality generated by the autoencoder 408 to ensure that the new audio has acceptable features to be used by the application. In a non-limiting exemplary use case, obtain input audio from a subject who has a certain characteristic (say Parkinson's disease) and use an embodiment of the invention to obtain new audio that is similar to the input audio but masks the Parkinson's markers.

The obfuscated audio samples are postprocessed and the bio-markers that were removed from the audio are reported, such as to the user who generated the original audio (operation 824).

In one example embodiment, the model is trained for multiple types of bio-markers; the trained model and bio-markers can be used, for example, by an external party's application. In some cases, it may not be clear which bio-marker is being used, such as if information on external parties is not available; however, the potential bio-marker(s) that could be used by the third party can be estimated.

One or more embodiments include obfuscating one or more bio-markers of speech of a human subject using the conditional auxiliary generative adversarial network (GAN), the corresponding supervised discriminator, and the corresponding denoising autoencoder, so that the audio processing system has access to an intelligible version of the speech but does not have access to the one or more bio-markers of the human subject. Thus, for example, bias based on the bio-markers is prevented, For example, the audio processing system could be an interactive voice response (IVR) system. Thus, in one example embodiment, the conditional auxiliary generative adversarial network (GAN), the corresponding supervised discriminator, and the corresponding denoising autoencoder are deployed in an interactive voice response (IVR) system. The interactive voice system digitizes the voice (speech) of a user of the IVR system and the audio obfuscation system 500 removes one or more types of bio-markers from the digitized speech prior to further processing. For example, the audio obfuscation system 500 may remove one or more types of bio-markers from the digitized speech of the user of the IVR system of a bank such that the bio-markers cannot be used in the processing of a loan application.

Furthermore, in another example embodiment, the audio processing system could be a search system and the conditional auxiliary generative adversarial network (GAN), the corresponding supervised discriminator, and the corresponding denoising autoencoder are deployed in the search system. The search system digitizes the voice (speech) of a user of the search system and the audio obfuscation system 500 removes one or more types of bio-markers (that identify, for example, the demographics of the user) from the digitized speech prior to further processing. For example, the audio obfuscation system 500 may remove one or more types of bio-markers from the digitized speech of a user of the search system such that the bio-markers cannot be used in the search for residential real estate. Given the discussion thus far, it will be appreciated that, in general terms, an exemplary method, according to an aspect of the invention, includes the operations of training, using at least one processor, a supervised discriminator 316, 404 to detect bio-markers in an audio sample dataset 412; training, using the at least one processor, a denoising autoencoder 320, 408 to learn a latent space that is used to reconstruct an output audio sample with a same fidelity as an input audio sample 416 of the audio sample dataset 412; training, using the at least one processor, a conditional auxiliary generative adversarial network (GAN) 500 to generate the output audio sample with the same fidelity as the input audio sample 416, wherein the output audio sample is void of the bio-markers; and deploying the conditional auxiliary generative adversarial network (GAN) 500, the corresponding supervised discriminator 316, 404, and the corresponding denoising autoencoder 320/408 in an audio processing system 400.

In one example embodiment, a classification generalization error is minimized during the training of the supervised discriminator 316, 404.

In one example embodiment, the training of the denoising autoencoder 320, 408 to learn the latent space that is used to reconstruct the output audio sample is performed by minimizing a KL-divergence based reconstruction error loss plus a fidelity term.

In one example embodiment, the KL-divergence based reconstruction error loss plus the fidelity term is based on one or more of a frequency response, a distortion, noise, and time-based errors.

In one example embodiment, a discriminator function is used as the supervised discriminator 316, 404 in the conditional auxiliary generative adversarial network (GAN) 500, and the denoising autoencoder 320, 408 as a generator, the conditional auxiliary generative adversarial network (GAN)

500 being trained such that the discriminator function attempts to maximize an entropy that clean samples pass through the discriminator 316, 404 and minimize an entropy that a denoised representation of bad samples containing the bio-markers pass through the supervised discriminator 316, 404.

In one example embodiment, the generator is frozen and backpropagating is performed through the discriminator function using a gradient from the generative adversarial network loss.

In one example embodiment, the discriminator function is frozen, and propagating is performed through the generator using the gradient from the generative adversarial network loss combined with a decaying constant times a reconstruction error loss of the generator.

In one example embodiment, the training of the denoising autoencoder 320, 408 and the training of the conditional auxiliary generative adversarial network 500 are iterated until convergence.

In one example embodiment, the supervised discriminator 316, 404 comprises a convolutional neural network that inputs mel-frequency cepstral coefficients (MFCC) representations of the audio sample dataset 412 and classifies a presence of the bio-marker, where a first classification represents the presence of the corresponding bio-marker and a second classification represents an absence of the corresponding bio-marker.

In one example embodiment, the supervised discriminator 316, 404 is created via model distillation from a black box teacher model 608.

In one example embodiment, the training of the supervised discriminator 316, 404 is based on extracted features from a mel-representation of the audio sample dataset 412.

In one example embodiment, the denoising autoencoder 320, 408 comprises a convolutional neural network that inputs MFCC representations of the audio sample dataset 412 and produces a denoised version of the MFCC representations.

In one example embodiment, one or more bio-markers of speech of a human subject are obfuscated using the conditional auxiliary generative adversarial network (GAN) 500, the corresponding supervised discriminator 316, 404, and the corresponding denoising autoencoder 320, 408 so that the audio processing system 400, 500 has access to an intelligible version of the speech but does not have access to the one or more bio-markers of the human subject.

In one aspect, an apparatus comprises a memory and at least one processor, coupled to the memory, and operative to perform operations comprising training a supervised discriminator 316, 404 to detect bio-markers in an audio sample dataset 412; training a denoising autoencoder 320, 408 to learn a latent space that is used to reconstruct an output audio sample with a same fidelity as an input audio sample 416 of the audio sample dataset 412; training a conditional auxiliary generative adversarial network (GAN) 500 to generate the output audio sample with the same fidelity as the input audio sample 416, wherein the output audio sample is void of the bio-markers; and deploying the conditional auxiliary generative adversarial network (GAN) 500, the corresponding supervised discriminator 316, 404, and the corresponding denoising autoencoder 320, 408 in an audio processing system.

In one aspect, a computer program product for federated learning comprises a computer readable storage medium having program instructions embodied therewith, the program instructions executable by a computer to cause the computer to perform operations comprising training a supervised discriminator 316, 404 to detect bio-markers in an audio sample dataset 412; training a denoising autoencoder 320, 408 to learn a latent space that is used to reconstruct an output audio sample with a same fidelity as an input audio sample 416 of the audio sample dataset 412; training a conditional auxiliary generative adversarial network (GAN) 500 to generate the output audio sample with the same fidelity as the input audio sample 416, wherein the output audio sample is void of the bio-markers; and deploying the conditional auxiliary generative adversarial network (GAN) 500, the corresponding supervised discriminator 316, 404, and the corresponding denoising autoencoder 320, 408 in an audio processing system.

Figure 9:
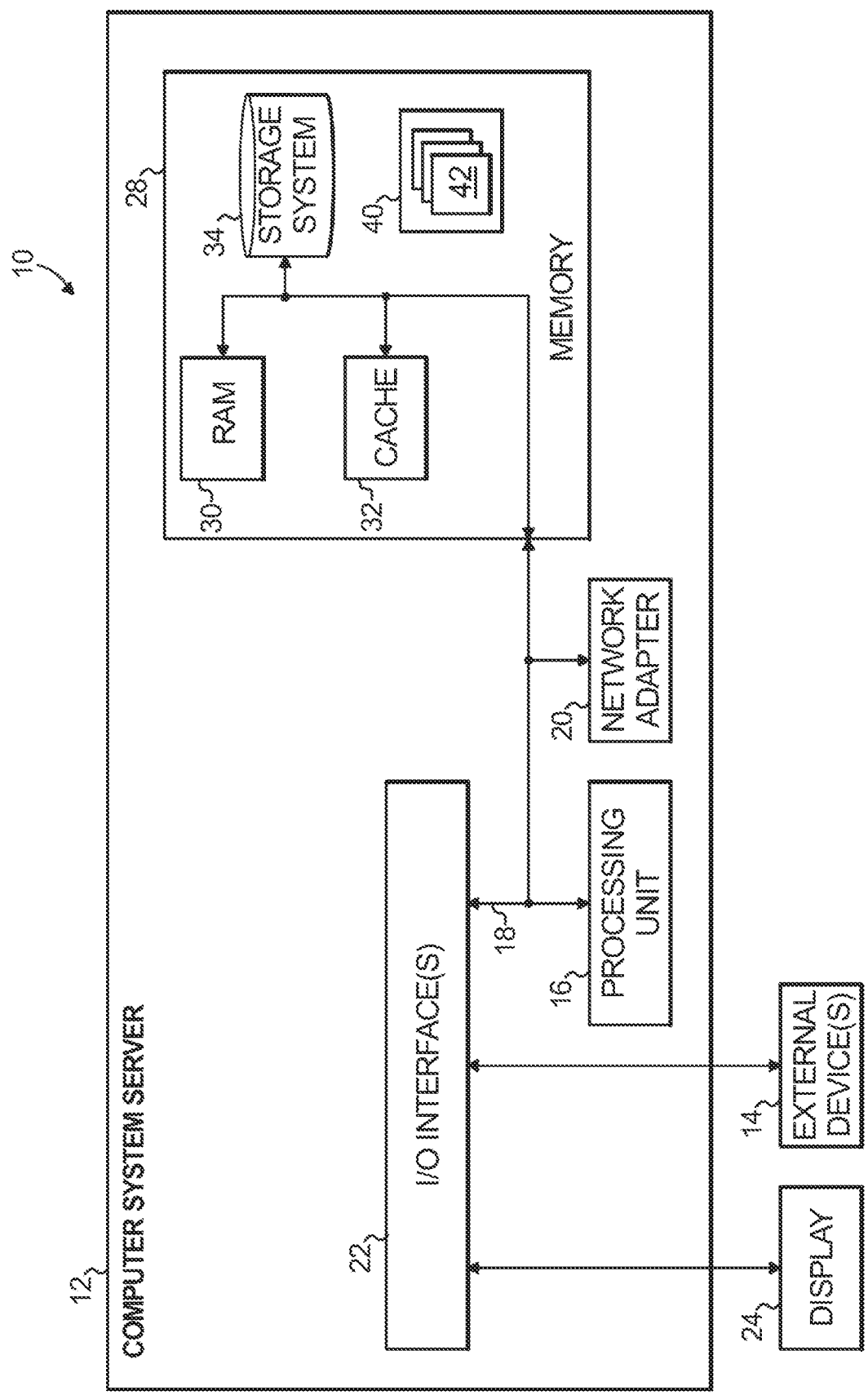
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
training, using at least one processor, a supervised discriminator to detect bio-markers in an audio sample dataset;
training, using the at least one processor, a denoising autoencoder to learn a latent space that is used to reconstruct an output audio sample with a same fidelity as an input audio sample of the audio sample dataset;
training, using the at least one processor, a conditional auxiliary generative adversarial network (GAN) to generate the output audio sample with the same fidelity as the input audio sample, wherein the output audio sample is void of the bio-markers; and
deploying the conditional auxiliary generative adversarial network (GAN), the supervised discriminator, and the denoising autoencoder in an audio processing system.

2. The method of claim 1, further comprising minimizing a classification generalization error during the training of the supervised discriminator.

3. The method of claim 1, wherein the training of the denoising autoencoder to learn the latent space that is used to reconstruct the output audio sample is performed by minimizing a KL-divergence based reconstruction error loss plus a fidelity term.

4. The method of claim 3, wherein the KL-divergence based reconstruction error loss plus the fidelity term is based on one or more of a frequency response, a distortion, noise, and time-based errors.

5. The method of claim 1, further comprising using a discriminator function as the supervised discriminator in the conditional auxiliary generative adversarial network (GAN), and the denoising autoencoder as a generator, the conditional auxiliary generative adversarial network (GAN) being trained such that the discriminator function attempts to maximize an entropy that clean samples pass through the discriminator and minimize an entropy that a denoised representation of bad samples containing the bio-markers pass through the supervised discriminator.

6. The method of claim 5, further comprising freezing the generator and backpropagating through the discriminator function using a gradient from the generative adversarial network loss.

7. The method of claim 6, further comprising freezing the discriminator function and propagating through the generator using the gradient from the generative adversarial network loss combined with a decaying constant times a reconstruction error loss of the generator.

8. The method of claim 1, further comprising iterating the training of the denoising autoencoder and the training of the conditional auxiliary generative adversarial network until convergence.

9. The method of claim 1, wherein the supervised discriminator comprises a convolutional neural network that inputs mel-frequency cepstral coefficients (MFCC) representations of the audio sample dataset and classifies a presence of the bio-marker, where a first classification represents the presence of the corresponding bio-marker and a second classification represents an absence of the corresponding bio-marker.

10. The method of claim 1, further comprising creating the supervised discriminator via model distillation from a black box teacher model.

11. The method of claim 1, wherein the training of the supervised discriminator is based on extracted features from a mel-representation of the audio sample dataset.

12. The method of claim 1, wherein the denoising autoencoder comprises a convolutional neural network that inputs MFCC representations of the audio sample dataset and produces a denoised version of the MFCC representations.

13. The method of claim 1, further comprising obfuscating one or more bio-markers of speech of a human subject using the conditional auxiliary generative adversarial network (GAN), the supervised discriminator, and the denoising autoencoder so that the audio processing system has access to an intelligible version of the speech but does not have access to the one or more bio-markers of the human subject.

14. An apparatus comprising:
a memory; and
at least one processor, coupled to said memory, and operative to perform operations comprising:
training a supervised discriminator to detect bio-markers in an audio sample dataset;
training a denoising autoencoder to learn a latent space that is used to reconstruct an output audio sample with a same fidelity as an input audio sample of the audio sample dataset;
training a conditional auxiliary generative adversarial network (GAN) to generate the output audio sample with the same fidelity as the input audio sample, wherein the output audio sample is void of the bio-markers; and
deploying the conditional auxiliary generative adversarial network (GAN), the supervised discriminator, and the denoising autoencoder in an audio processing system.

15. The apparatus of claim 14, the operations further comprising minimizing a classification generalization error during the training of the supervised discriminator.

16. The apparatus of claim 14, wherein the training of the denoising autoencoder to learn the latent space that is used to reconstruct the output audio sample is performed by minimizing a KL-divergence based reconstruction error loss plus a fidelity term.

17. The apparatus of claim 14, wherein the operations further comprise using a discriminator function as the supervised discriminator in the conditional auxiliary generative adversarial network (GAN), and the denoising autoencoder as a generator, the conditional auxiliary generative adversarial network (GAN) being trained such that the discriminator function attempts to maximize an entropy that clean samples pass through the discriminator and minimize an entropy that a denoised representation of bad samples containing the bio-markers pass through the supervised discriminator.

18. The apparatus of claim 17, the operations further comprising freezing the generator and backpropagating through the discriminator function using a gradient from the generative adversarial network loss.

19. The apparatus of claim 18, the operations further comprising freezing the discriminator function and propagating through the generator using the gradient from the generative adversarial network loss combined with a decaying constant times a reconstruction error loss of the generator.

20. A computer program product for federated learning, the computer program product comprising a computer readable storage medium having program instructions embodied therewith, the program instructions executable by a computer to cause the computer to perform operations comprising:
- training a supervised discriminator to detect bio-markers in an audio sample dataset;
- training a denoising autoencoder to learn a latent space that is used to reconstruct an output audio sample with a same fidelity as an input audio sample of the audio sample dataset;
- training a conditional auxiliary generative adversarial network (GAN) to generate the output audio sample with the same fidelity as the input audio sample, wherein the output audio sample is void of the bio-markers; and
- deploying the conditional auxiliary generative adversarial network (GAN), the supervised discriminator, and the denoising autoencoder in an audio processing system.

* * * * *